United States Patent [19]
Huff et al.

[11] Patent Number: 5,901,671
[45] Date of Patent: May 11, 1999

[54] METHOD OF DETERMINING THE COMPOSITION OF FUEL IN A FLEXIBLE FUELED VEHICLE AFTER FUEL BLENDING

[75] Inventors: Shean Huff, Ann Arbor; Yi Cheng, Jackson; Robert J. Nankee, II, Canton; Mary Joyce, Farmington Hills; Jerry Kennie, Caton; Roland T. Richardson, Detroit; Gary L. Seitz, Chelsea, all of Mich.

[73] Assignee: DaimlerChrysler Corporation, Auburn Hills, Mich.

[21] Appl. No.: 08/959,820

[22] Filed: Oct. 29, 1997

[51] Int. Cl.$^6$ .................................................. F02B 75/12
[52] U.S. Cl. ........................................... 123/1 A; 123/494
[58] Field of Search .................................... 123/1 A, 494, 123/672

[56] References Cited

U.S. PATENT DOCUMENTS

| | | | |
|---|---|---|---|
| 5,170,763 | 12/1992 | Kitajima et al. | 123/494 |
| 5,172,655 | 12/1992 | Forgacs | 123/494 |
| 5,179,926 | 1/1993 | Ament | 123/1 A |
| 5,190,014 | 3/1993 | Suga et al. | 123/494 |
| 5,233,944 | 8/1993 | Mochizuki | 123/1 A |
| 5,255,661 | 10/1993 | Nakee, II et al. | |
| 5,335,637 | 8/1994 | Davis et al. | |
| 5,365,917 | 11/1994 | Adams et al. | |
| 5,400,762 | 3/1995 | Fodale et al. | |
| 5,415,145 | 5/1995 | Letcher et al. | |
| 5,435,285 | 7/1995 | Adams et al. | |
| 5,467,755 | 11/1995 | Konrad et al. | |
| 5,497,753 | 3/1996 | Kopera | |
| 5,520,162 | 5/1996 | Rotramel et al. | |
| 5,850,824 | 12/1998 | Seitz et al. | 123/1 A |

*Primary Examiner*—John Kwon
*Attorney, Agent, or Firm*—Mark P. Calcaterra

[57] ABSTRACT

The present invention provides a flexible fuel compensation system for determining the percent alcohol content of fuel in a flexible fueled vehicle at the instance of fueling and in an open loop operating mode. According to the invention, two estimated percent alcohol content values are calculated based on the old fuel mixture's alcohol content and two fueling possibilities. A first value is calculated for the possibility that E85 fuel was added to the tank and a second value is calculated for the possibility that E0 fuel was added to the tank. If the inferred ethanol content increases above a positive threshold during closed loop operation, the system assumes that E85 fuel has been added to the tank. Conversely, if the inferred ethanol content decreases below a negative threshold, the system assumes that E0 fuel was added to the tank. Accordingly, if the vehicle is shut down before a more accurate ethanol content determination is complete, the inferred ethanol content follows either the first or second estimated alcohol content value until the system reaches a closed loop operating condition.

6 Claims, 1 Drawing Sheet

METHOD OF DETERMINING THE COMPOSITION OF FUEL IN A FLEXIBLE FUELED VEHICLE AFTER FUEL BLENDING

BACKGROUND OF THE INVENTION

1. Technical Field

This invention generally relates to fuel control systems and, more particularly, to a method of determining the percent alcohol content of a fuel used in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

In a returnless fuel system, once the fuel enters the fuel line, the only exit is through the fuel injectors into the engine. Two particular characteristics of interest related to this one way-in, one way-out system are that there is a delay from the time fuel is added to the tank to the time the new fuel mixture reaches the engine and that the fuel tends to mix in the fuel system such that there is no step change from the old fuel mixture to the new fuel mixture. These characteristics affect how the fuel compensation is controlled in a flexible fueled vehicle after a fueling event. That is, these characteristics must be accounted for regardless of whether the ethanol content of the fuel is being determined by a fuel composition sensor or inferred by an oxygen feedback system.

SUMMARY OF THE INVENTION

It is, therefore, one object of the present invention to provide a system of flexible fuel compensation.

It is another object of the present invention to provide a flexible fuel compensation system for theoretically determining the percent ethanol content of fuel being delivered to the engine at the instance of fueling to insure accurate operating parameters.

It is yet another object of the present invention to provide a flexible fuel compensation system for determining a direction of the percent ethanol content of fuel (i.e., towards 85% ethanol or 0% ethanol) for calculating theoretical values that may be used in an open loop operating condition.

The above and other objects are provided by a method of determining the percent alcohol content of fuel for a flexible fuel control system in a flexible fueled vehicle. According to the present invention, two curves are calculated based on the old fuel mixture's (i.e., the fuel in the tank before a fuel tank fill) ethanol content and two fueling possibilities. An E85 curve is calculated for the possibility that 85% ethanol and 15% gasoline was added to the tank and an E0 curve is calculated for the possibility that 0% ethanol and 100% gasoline was added to the tank. If the inferred ethanol content increases above a positive delta threshold during a closed loop update, the methodology assumes that E85 has been added to the tank. As such, if the vehicle is shut down before a more accurate ethanol content determination is complete, the engine operating parameters follow the inferred ethanol content E85 curve until the system reaches a closed loop operating condition. Conversely, if the inferred ethanol content decreases below a negative delta threshold, the methodology assumes that E0 was added to the tank. Accordingly, if the vehicle is shut down before a more accurate ethanol content determination is complete, the engine operating parameters follow the inferred ethanol content E0 curve until the system reaches a closed loop operating condition.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
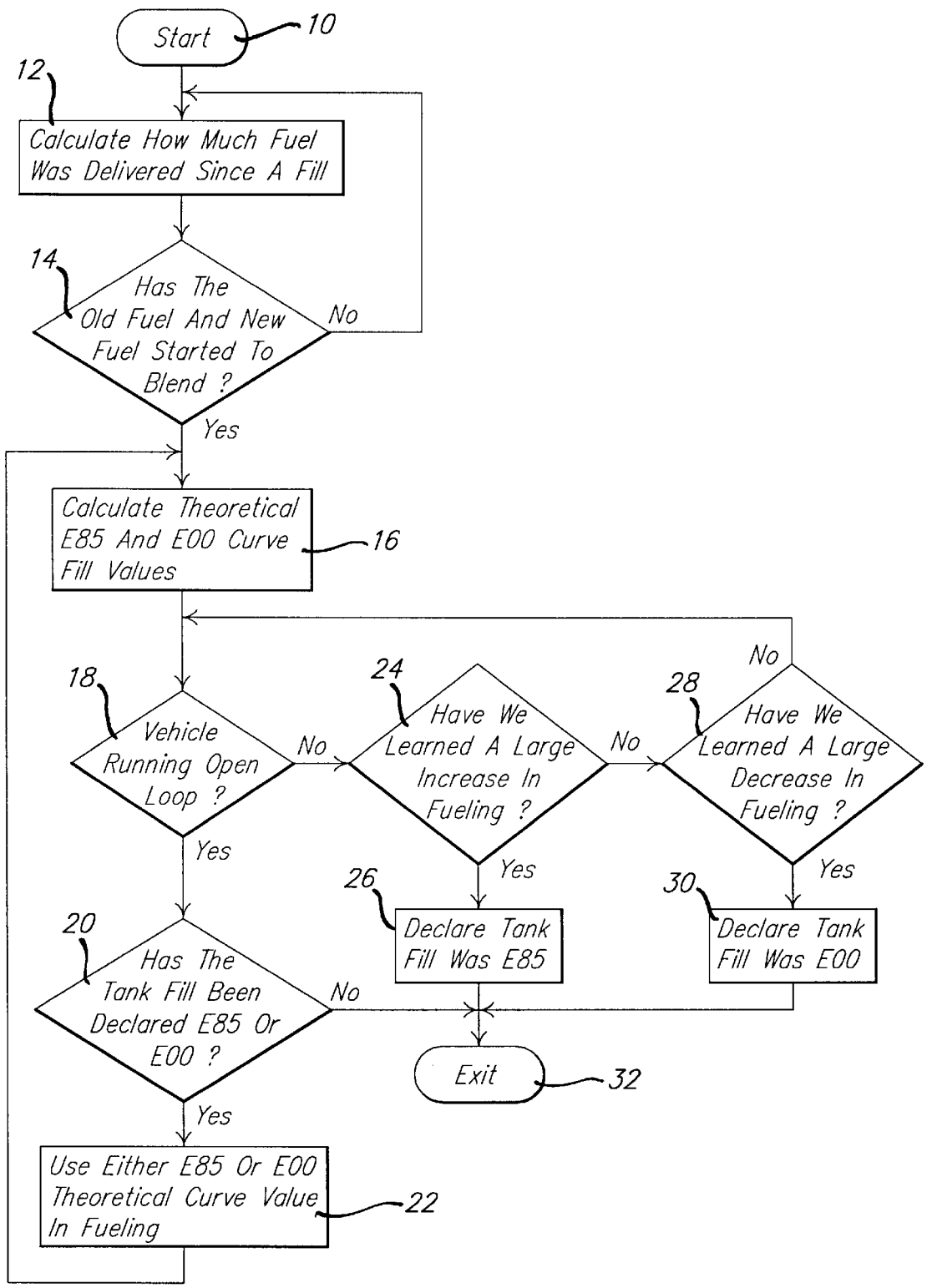
FIG. 1 is a flow chart of a method for determining the percent alcohol content of fuel used in a flexible fueled vehicle at the instance of fueling or when operating in an open loop mode.

The present invention is directed towards a flexible fuel compensation system for determining the percent alcohol content of a fuel used in a flexible fueled vehicle at the instance of fueling or when operating in an open loop mode. For the purpose of this specification, an open loop operating mode refers to a state of engine operation in which feedback and fuel control changes are not based on a functioning, accurate oxygen sensor. Advantageously, the flexible fuel compensation system of the present invention enables accurate fueling parameters to be set for smooth engine operation during a blending period when newly added fuel is still mixing with old fuel in the vehicle's fuel system. As such, the flexible fuel compensation system proscribes severe fueling errors during the blend period if the blending occurs during an open loop operating condition until a closed loop operating condition is reached. A closed loop mode is that engine operating state in which feedback and fuel control changes are based on a functioning accurate oxygen sensor. Accordingly, the present invention provides for accurate fueling of the internal combustion engine when a fuel blend occurs. A more detailed explanation of feedback and fuel control can be found in U.S. Ser. No. 08/958,411, entitled "Method of Determining the Composition of Fuel in a Flexible Fueled Vehicle" to Nankee II et al. which is hereby expressly incorporated by reference herein.

When a percent ethanol content of fuel is being inferred using an oxygen sensor feedback system, once the ethanol content in the fuel tank has been determined after a fuel addition, the percent alcohol content learning system is disabled until the next fuel addition. Often, the ethanol learning system is not immediately started when fuel is added to the tank, but instead is delayed until the new fuel mixture begins to reach the engine. The length of the delay is dependent on the flow rate of the fuel through the fuel system. Advantageously, the delay is based on an accumulation of fuel injector pulse widths, which is proportional to the volume of fuel delivered. Using the fuel injector pulse widths as a measure of the fuel delivered to the engine, the pulse width accumulation over time is correlated to the amount of fuel delivered before the new fuel starts to reach the engine.

Due to mixing in the fuel lines and fuel rail in conventional fuel systems, as well as the multi-injector fueling system, there is no step change from the old fuel mixture to the new fuel mixture. In fact, if the new fuel mixture is not delivered in equal length rails to each injector, there may be a difference in fuel composition delivered from one cylinder to the next, until all of the old fuel mixture is purged from the fuel system.

If the oxygen sensor of the oxygen sensor feedback system is assumed to sense an average of the fuel mixtures between all of the cylinders, the inferred ethanol content will follow a continuous curve from the old fuel mixture's ethanol content to the new fuel mixture's ethanol content. The rate at which the inferred ethanol content will follow the curve is related to the fuel flow rate through the engine, which is correlated to injector pulse width accumulation.

According to the present invention, two inferred percent ethanol content curves are calculated based on the old fuel mixture's ethanol content and two fueling possibilities. An E85 curve is calculated for the possibility that E85 (85% ethanol and 15% gasoline) was added to the tank and an E0 curve is calculated for the possibility that E0 (0% ethanol and 100% gasoline) was added to the tank. The only other fuel commercially available is E10 (10% ethanol and 90% gasoline), which is close enough to E0 fuel to be treated as such. The output of these curves are indicative of the ethanol content delivered to the engine versus the input of pulse width accumulation.

If the inferred ethanol content increases above a positive delta threshold during a closed loop update, the methodology assumes that E85 fuel has been added to the tank. In this case, if the vehicle is shut down before the fuel composition system's normal percent alcohol content determination is complete, the inferred ethanol content follows the E85 calculated curve until the system reaches closed loop conditions. On the other hand, if the inferred ethanol content decreases below a negative delta threshold, the system assumes that E0 fuel was added to the tank. In this case, if the vehicle is shut down before the fuel composition system's normal percent alcohol content determination is complete, the inferred ethanol content follows the E0 calculated curve until the system reaches closed loop conditions.

As stated above, when fueling a flexible fueled vehicle there are three possible ethanol contents that can be added to the old fuel mixture. These three possible ethanol contents are E0 (0% ethanol), E10 (10% ethanol), and E85 (85% ethanol). Using the two extremes of E0 and E85, the minimum and maximum possible fuel tank compositions are calculated after each fuel addition. The information needed to calculate the possible fuel compositions also includes the ethanol concentration and the volume of the fuel in the tank before the fuel addition and the volume of the new fuel being added. Having this information, the following equations are used to calculate these possibilities:

E0 possibility=(old concentration)*(old volume)/(new volume); and

E85 possibility=[(old concentration)*(old volume)+(85% ethanol)*(added volume)]/(new volume).

Turning now to the drawing FIGURE, FIG. 1 illustrates a method of flexible fuel compensation control for a flexible fuel compensation system of a flexible fueled vehicle. The methodology starts at bubble 10 and falls through to block 12. In block 12, the methodology calculates how much fuel was delivered since the last fuel fill-up. This is preferably accomplished with a conventional fuel level sensor. From block 12, the methodology advances to decision block 14.

In decision block 14, the methodology determines if the old fuel mixture and the new fuel mixture have started to blend. To determine this, a counter is employed to indicate when a sufficient period of time has elapsed to ensure blending has started. If blending has not started, the methodology returns to block 12 and continues in this loop until the required period has passed. When the old fuel mixture and the new fuel mixture have started to blend, the methodology advances to block 16.

In block 16, the methodology calculates theoretical E85 and E0 curve fill values. From block 16, the methodology advances to decision block 18 and determines if the vehicle is operating in an open loop mode. If the vehicle is running in an open loop mode, the methodology advances to decision block 20 and determines if the tank fill has been declared either E85 or E0 (see blocks 26 and 30). If so, the methodology advances to block 22 and uses either the E85 or the E0 theoretical curve value in setting engine operating parameters. From block 22 the methodology returns to block 16 and recalculates theoretical E85 and E0 curve fill values.

Returning again to decision block 18, if the vehicle is not running in an open loop mode, the methodology advances to decision block 24. In decision block 24 the methodology determines if a large increase in fueling has occurred. That is, has the closed loop feedback system indicated a lean operating condition for a long enough period of time to indicate that ethanol is in the tank as the fuel delivered to the intake manifold is increased. If so, the methodology advances to block 26 and declares the tank fill to have been filled with E85 fuel.

If the methodology determines that no large increase in fueling occurred at decision block 24, the methodology advances to decision block 28 and determines if a large decrease in fueling has occurred. That is, has the closed loop feedback system indicated a rich operating condition for a long enough period of time to indicate that gasoline is in the tank as the fuel delivered to the intake manifold is decreased. If so, the methodology advances to block 30 and declares that the tank was filled with E0 fuel. If no large decrease in fueling has occurred, the methodology advances from decision block 28 to decision block 18 and redetermines if the vehicle is running in an open loop mode. After declaring the tank fill as either E85 or E0 in block 26 or 30, the methodology advances to bubble 32 where it is returned to start-up bubble 10 and eventually sets engine operating parameters according to the E85 or E0 curves at block 22.

According to the above, the present invention provides a flexible fuel compensation system for determining the percent alcohol content of a fuel used in a flexible fueled vehicle at the instance of fueling or when operating in an open loop mode. The flexible fuel compensation system enables accurate fueling parameters to be set for smooth engine operation during a blending period and in an open loop mode. As such, accurate fueling of the internal combustion engine may be provided.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine in a flexible fueled vehicle based on an estimated value of percent alcohol content of a fuel comprising:

detecting a fuel addition to a tank of the vehicle;

calculating a first estimated value of percent alcohol content in the fuel for the possibility that E85 fuel was added to the tank;

calculating a second estimated value of percent alcohol content in the fuel for the possibility that E0 fuel was added to the tank;

setting said combustion parameters according to said first estimated value of percent alcohol content in the fuel if an inferred ethanol content of the fuel exceeds a positive threshold; and setting said combustion parameters according to said second estimated value of percent alcohol content in the fuel if the inferred ethanol content of the fuel exceeds a negative threshold.

2. The method of claim 1 wherein said first estimated value of percent alcohol content in the fuel corresponds to a concentration of alcohol in the fuel prior to the fuel addition, a volume of the fuel in the tank prior to the fuel addition, an 85% ethanol multiplier, a volume of the fuel addition and a new volume in the tank after the fuel addition.

3. The method of claim 1 wherein said second estimated value of percent alcohol content in the fuel corresponds to a concentration of alcohol in the fuel prior to the fuel addition, a volume of the fuel in the tank prior to the fuel addition, and a volume of the fuel addition.

4. The method of claim 1 further comprising the step of determining if old fuel in the tank and new fuel from the fuel addition have started to blend.

5. The method of claim 1 further comprising declaring the tank to have been filled with E85 fuel if the vehicle is operating in a closed loop mode and a large increase in fueling has been detected.

6. The method of claim 1 further comprising declaring the tank to have been filled with E0 fuel if the vehicle is operating in a close loop mode and a large decrease in fueling has been detected.

* * * * *